United States Patent
Berkey et al.

(10) Patent No.: US 6,201,237 B1
(45) Date of Patent: Mar. 13, 2001

(54) FIBER OPTIC SENSOR

(75) Inventors: George E. Berkey, Pine City; Mark F. Krol, Painted Post; Daniel A. Nolan, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/344,256

(22) Filed: Jun. 25, 1999

Related U.S. Application Data
(60) Provisional application No. 60/112,726, filed on Dec. 18, 1998.

(51) Int. Cl.[7] ............... G01B 9/02; G02B 6/26
(52) U.S. Cl. ................. 250/227.14; 250/231.1; 385/12; 356/35.5
(58) Field of Search .............. 250/227.14, 227.17, 250/227.18, 227.19, 231.1; 385/1, 12, 13, 15, 30; 356/35.5, 32, 33, 34, 345, 351

(56) References Cited

U.S. PATENT DOCUMENTS

| | | | |
|---|---|---|---|
| 4,229,067 | 10/1980 | Love | 350/96.15 |
| 4,275,406 | 6/1981 | Muller et al. | 357/26 |
| 4,584,470 | 4/1986 | Iizuka et al. | 250/231 R |
| 4,773,753 | 9/1988 | Hirose et al. | 356/35.5 |
| 4,920,261 | 4/1990 | Bock et al. | 250/225 |
| 4,950,318 | 8/1990 | Dyott | 65/402.1 |
| 5,054,922 | 10/1991 | Kersey | 356/345 |
| 5,115,127 | 5/1992 | Bobb et al. | 250/227.19 |
| 5,295,205 | 3/1994 | Miller et al. | 385/1 |
| 5,297,436 | 3/1994 | Chan et al. | 73/657 |
| 5,361,130 | 11/1994 | Kersey et al. | 356/345 |
| 5,361,313 | 11/1994 | O'Keefe | 385/11 |
| 5,380,995 | 1/1995 | Udd et al. | 250/227.18 |
| 5,399,854 | 3/1995 | Dunphy et al. | 250/227.18 |
| 5,515,459 | 5/1996 | Farhadiroushan | 385/12 |
| 5,563,967 | 10/1996 | Haake | 385/12 |
| 5,623,561 | 4/1997 | Hartman | 385/12 |
| 5,633,959 | 5/1997 | Niki et al. | 385/11 |
| 5,641,955 | 6/1997 | Bonniau et al. | 250/227.14 |
| 5,895,912 | * 4/1999 | Bosselmann et al. | 250/227.17 |

OTHER PUBLICATIONS

Optics Letters Jun. 1, 1997, vol. 22, No. 11 "Temperature and strain dependence of the power level and frequency of spontanteous Brillouin scattering I optical fibers" T.R. Parker, M. Farhadiroushan, V.A. Handerek, and A.J. Rogers, pp. 787–789.

Optics Letters Apr. 1, 1997, vol. 22, No. 7 "All–fiber absolute temperature sensor using an unbalanced high–birefringence Sagnac loop" E. DelaRosa, L.A. Zenteno, A.N. Starodumov, and D. Monzon, pp. 481–484.

Optics Letters Jun. 1, 1997, vol. 22, No. 11 "Interferometric temperature–insensitive strain measurement with different–diameter fiber Bragg gratings" M Song, B Lee, S.B. Lee and S.S. Choi, pp. 790–792.

* cited by examiner

Primary Examiner—John R. Lee
(74) Attorney, Agent, or Firm—Daniel P. Malley

(57) ABSTRACT

A fiber optic sensor for simultaneously and independently measuring temperature and axial stress. The fiber sensor includes a pair of polarization-maintaining fibers that have known strain and temperature response curves. Each fiber has a plurality of fiber segments in which the elliptical cores are rotated 45° relative to the preceding core segment. Thus, the phase shift induced by temperature or stress in each of the fibers is detected, and the strain and temperature are derived from the detected phase shift. The fiber optic sensor is capable of dual operation. As both a temperature sensor and an axial stress sensor.

36 Claims, 6 Drawing Sheets

FIBER OPTIC SENSOR

This application claims the benefit of U.S. Provisional Application No. 60/112,726, filed Dec. 18, 1998.

BACKGROUND OF THE INVENTION

1. Field of the Invention

The present invention relates generally to fiber optic sensors, and more particularly to a method and apparatus for independently measuring the temperature and axial strain of an optical fiber.

2. Technical Background

Fiber optic sensors, and in particular distributed fiber sensors, are of interest for smart structures and other monitoring applications. Smart structures are often composite structures that may incorporate electrical communication devices for monitoring or actively controlling the operation of the structure. A sensor is required to monitor the conditions the smart structure is subjected to. A fiber sensor, for example, can be embedded within the layers of the composite structure to determine strain and temperature. There are other industrial applications that require knowledge of the environment in order to control both the quality and productivity of the process. Interest has peaked recently with the encouraging results obtained using Bragg gratings distributed along the length of the sensing fiber. One issue that arises with fiber optic sensors relates to their sensitivity to both temperature and strain. In one approach that has been considered, a combined strain and temperature sensor using polarization-maintaining fibers was developed. Unfortunately, it was determined that the temperature and the strain values obtained by the sensor were dependent upon one another. Thus, the values measured by the sensor were inherently skewed.

A sensor that can measure temperature without being adversely affected by a strain component, or conversely, a sensor that is able to measure strain without a temperature component is therefore desired.

In another approach, a first polarization-maintaining fiber having an elliptical core is fused to a second polarization-maintaining fiber having an elliptical core. The major axis of the second fiber is rotated 90° with respect to the first fiber. When a polarized light signal is transmitted through the fibers, the temperature and strain affect the phase of the light signal differently. This relationship is characterized by the following equations:

$$\Delta\phi_1 = A_1 L_1 \Delta T + B_1 \Delta L_1, \quad (1)$$

$$\Delta\phi_2 = A_2 L_2 \Delta T + B_2 \Delta L_2. \quad (2)$$

wherein $\Delta\phi_1$ is the change in phase difference in the first fiber, $A_1$ is the temperature coefficient for the change in temperature of the first fiber, $L_1$ is the length of the first fiber, $\Delta T$ is the change in temperature, $B_1$ is the strain coefficient for the change in strain of the first fiber, $\Delta L_1$ is the change in the length of the first fiber due to strain, $\Delta\phi_2$ is the change in phase difference in the second fiber, $A_2$ is the temperature coefficient for the change in temperature of the first fiber, $L_2$ is the length of the second fiber, $\Delta T$ is the change in temperature, $B_2$ is the strain coefficient for the change in strain of the second fiber, $\Delta L_2$ is the change in the length of the second fiber due to strain.

In order to "de-couple" temperature and strain, the two fibers must be selected such that either their strain coefficients are equal, or that their temperature coefficients are equal, such that:

$$B_1 \Delta L_1 = B_2 \Delta L_2, \text{ or} \quad (3)$$

$$A_1 L_1 \Delta T = A_2 L_2 \Delta T. \quad (4)$$

Thus, when the phase differences of the two fibers are subtracted, $$\Delta\phi = \Delta\phi_1 - \Delta\phi_2 \quad (5)$$

The variable having equal coefficients is eliminated. Thus, a single variable is obtained. However, there are disadvantages to this approach. First, the two have fibers must be precisely selected to equalize the phase difference between the first and second fibers caused by either strain or temperature. Secondly, it is understood from equations 3, 4, and 5 that the sensor is limited to detecting either temperature or strain. It cannot detect both simultaneously.

Thus, a need exists for a fiber optic sensor that has the ability to accurately measure strain on a fiber without that measurement being affected by the temperature, while simultaneously being able to accurately measure the temperature of the fiber's environment without the temperature measurement being affected by the applied strain.

SUMMARY OF THE INVENTION

The existing problems discussed above are solved with the present invention. The present invention includes a pair of fibers each having a plurality of polarization-maintaining fiber segments and a phase shifter disposed therein. Because the strain and temperature response curves of the phase shifters deployed in each fiber are so different, temperature and strain can be measured independently and simultaneously.

One aspect of the invention relates to an optical fiber that propagates a light signal characterized by a center wavelength. The optical fiber is disposed in an environment and used for measuring a plurality of environmental parameters. The optical fiber includes a plurality of polarization-maintaining fiber segments, each of which has a cladding and an elliptical core. The major axis of each of the plurality of polarization-maintaining fiber segments is rotated 45° with respect to a preceding fiber segment, and optically connected to that preceding fiber segment. The optical fiber also includes a sensing element disposed within the plurality of polarization-maintaining fiber segments. The sensing element shifts the center wavelength of the light signal at a predetermined rate in response to the plurality of environmental parameters.

Another aspect of the invention relates to a Mach-Zehnder device that couples a light signal characterized by a center wavelength. The Mach-Zehnder device is disposed in an environment and used to measure a plurality of environmental parameters. The Mach-Zehnder device includes a first polarization-maintaining fiber for propagating the light signal. The first polarization maintaining fiber includes a first elliptical core, a first cladding, and a plurality of first fiber segments, wherein each of the plurality of first fiber segments is rotated 45° with respect to a preceding first fiber segment and optically connected to the preceding first fiber segment. It also includes a second polarization maintaining fiber disposed adjacent to the first polarization-maintaining fiber. The second polarization maintaining fiber includes a second elliptical core, a second cladding, and a plurality of second fiber segments, wherein each of the plurality of second fiber segments is rotated 45° with respect to a preceding second fiber segment and optically connected to the preceding second fiber segment. A coupling region is disposed between the first polarization-maintaining fiber and the second polarization-maintaining fiber for coupling the light signal between the first and second polarization-maintaining fibers. A sensing element is disposed in the first and second polarization maintaining fibers. The sensing element shifts the center wavelength of the light signal at a first predetermined rate in the first polarization-maintaining fiber and by a second predetermined rate in the second polarization-maintaining fiber, in response to one or more of the plurality of environmental parameters.

Another aspect of the invention relates to a fiber optic sensor disposed in an environment and used for measuring a plurality of environmental parameters. The fiber optic sensor includes a polarized light source for transmitting a light signal having a center wavelength and a first polarization-maintaining fiber connected to the polarized light source. The first polarization-maintaining fiber includes a first elliptical core, a first cladding, and a plurality of first fiber segments. The fiber optic sensor also includes a second polarization-maintaining fiber disposed adjacent the first polarization-maintaining fiber. The second polarization-maintaining fiber includes a second elliptical core, a second cladding, and a plurality of second fiber segments. A coupling region is disposed between the first polarization-maintaining fiber and the second polarization-maintaining fiber, such that the light signal is coupled between the first and second polarization maintaining fibers. A sensing element is disposed in the first and second polarization maintaining fibers. The sensing element shifts the center wavelength of the light signal at a first predetermined rate in the first polarization-maintaining fiber and by a second predetermined rate in the second polarization-maintaining fiber, in response to the plurality of environmental parameters.

The fiber optic sensor of the present invention results in a number of advantages over sensors disclosed in the related art. First, the present invention accurately measures strain on a fiber without that measurement being affected by the temperature. Secondly, it accurately measures the temperature of the fiber's environment, without that measurement being affected by the strain. Further, the present invention has dual functionality, in that the sensor can be used to simultaneously measure both temperature and strain.

DETAILED DESCRIPTION OF THE PREFERRED EMBODIMENTS

Figure 1:
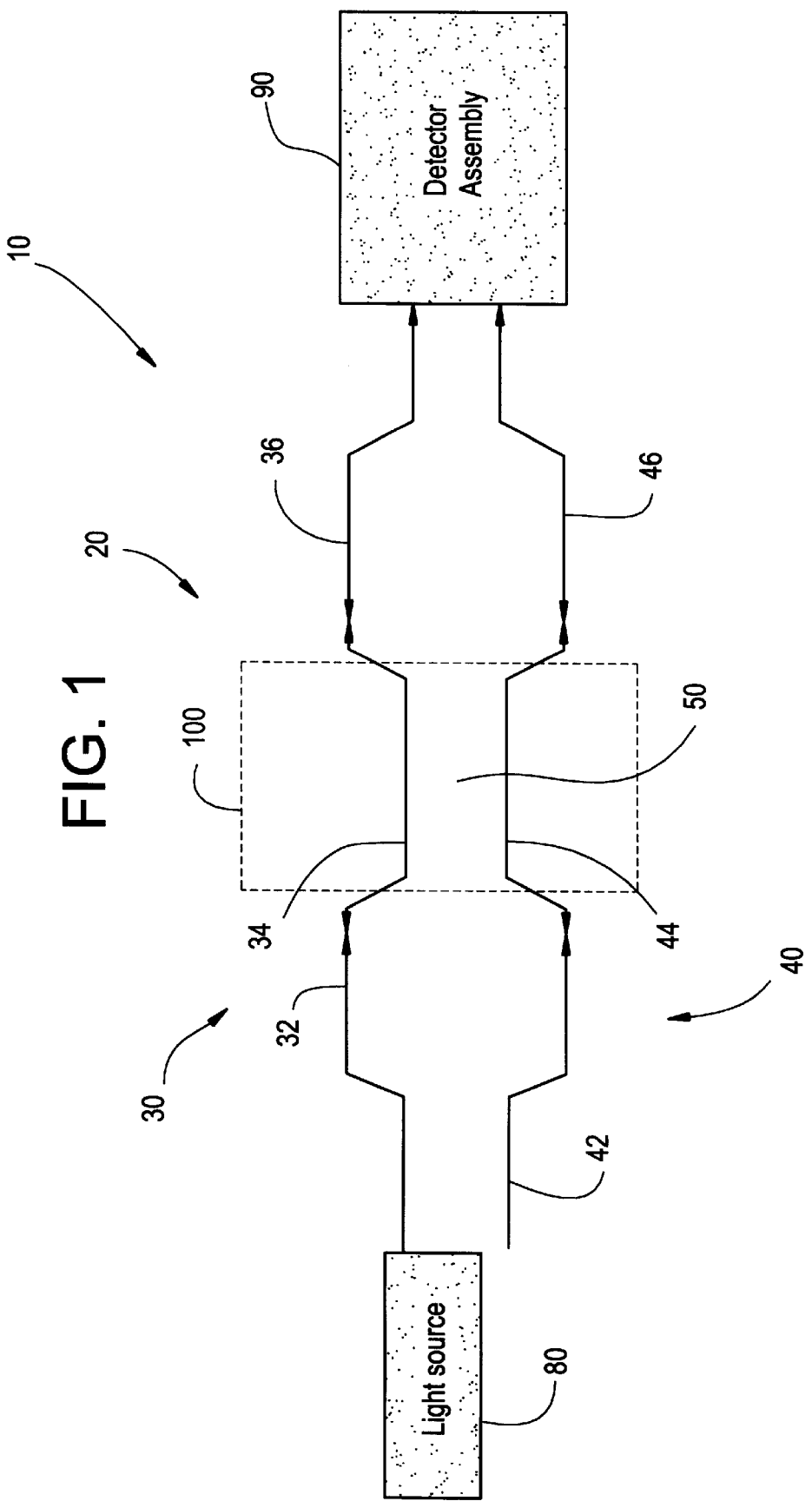
FIG. 1 is a schematic diagram of one embodiment of the fiber optic sensor according to the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the fiber optic sensor is shown in FIG. 1, and is designated generally throughout by reference numeral 10.

In accordance with the invention, the fiber optic sensor 10 includes a pair of fibers 30, 40 that can be deployed in a ribbon cable and used to independently measure both longitudinal stress and temperature. Fiber optic sensor 10 has the utility of being able to accurately measure strain on a fiber without the measurement being dependent upon the temperature. Likewise, it is able to accurately measure the temperature of the fiber's environment without the temperature measurement being dependent upon the strain.

As embodied herein and depicted in FIG. 1, fiber optic sensor 10 includes a polarized light source 80 connected to a Mach-Zehnder device 20. The Mach-Zehnder device 20 is connected to detector assembly 90. The Mach-Zehnder device 20 includes a first polarization-maintaining fiber 30 and a second polarization-maintaining fiber 40. A coupling region 50 is formed between the first polarization-maintaining fiber 30 and the second polarization-maintaining fiber 40. The polarized light signal that is injected into the first polarization-maintaining fiber 30 is evanescently coupled into the second polarization-maintaining fiber 40 in the coupling region 50. The light signals propagating in both of the fibers 30, 40 terminate in detector assembly 90. The first fiber 30 includes segments 32, 34, and 36. The second fiber 40 includes segments 42, 44, and 46. Segments 34 and 44 are disposed in the environment 100 that is being measured.

Figure 2:
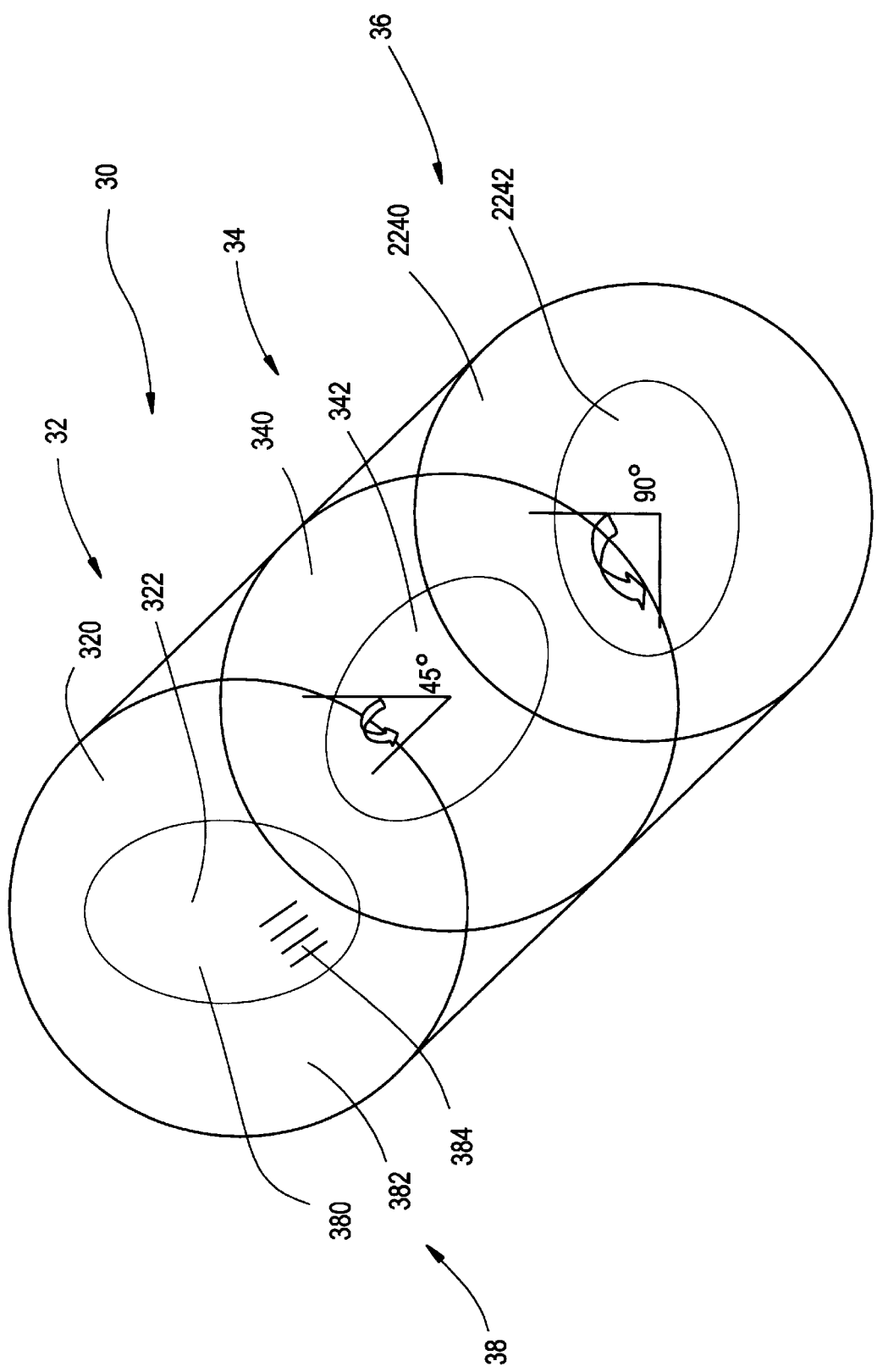
FIG. 2 is a sectional view of a first polarization-maintaining optical fiber of the sensor of FIG. 1 showing the relationship between the three fiber segments that make up the polarization maintaining optical fiber.

FIG. 2 is a sectional view of the first polarization-maintaining fiber 30 shown in FIG. 1. The first polarization-maintaining fiber 30 includes three fiber segments that are spliced or fused together in a back-to-back arrangement. The first segment 32 has cladding 320 and an elliptical core 322. The second fiber segment 34 also has a cladding 340 and an elliptical core 342. Note that the second fiber segment 34 is rotated around its longitudinal axis 45° with respect to the first segment 32. The third fiber segment 36 also has cladding 360 and an elliptical core 362. The third fiber segment 36 is rotated around its longitudinal axis 45° with respect to the second segment 34 and 90° with respect to the first segment 32. Each polarization-maintaining fiber includes a sensing element 38. The sensing element 38 is implemented by using either a doped core 380, doped cladding 382, or a grating 384.

Figure 3:
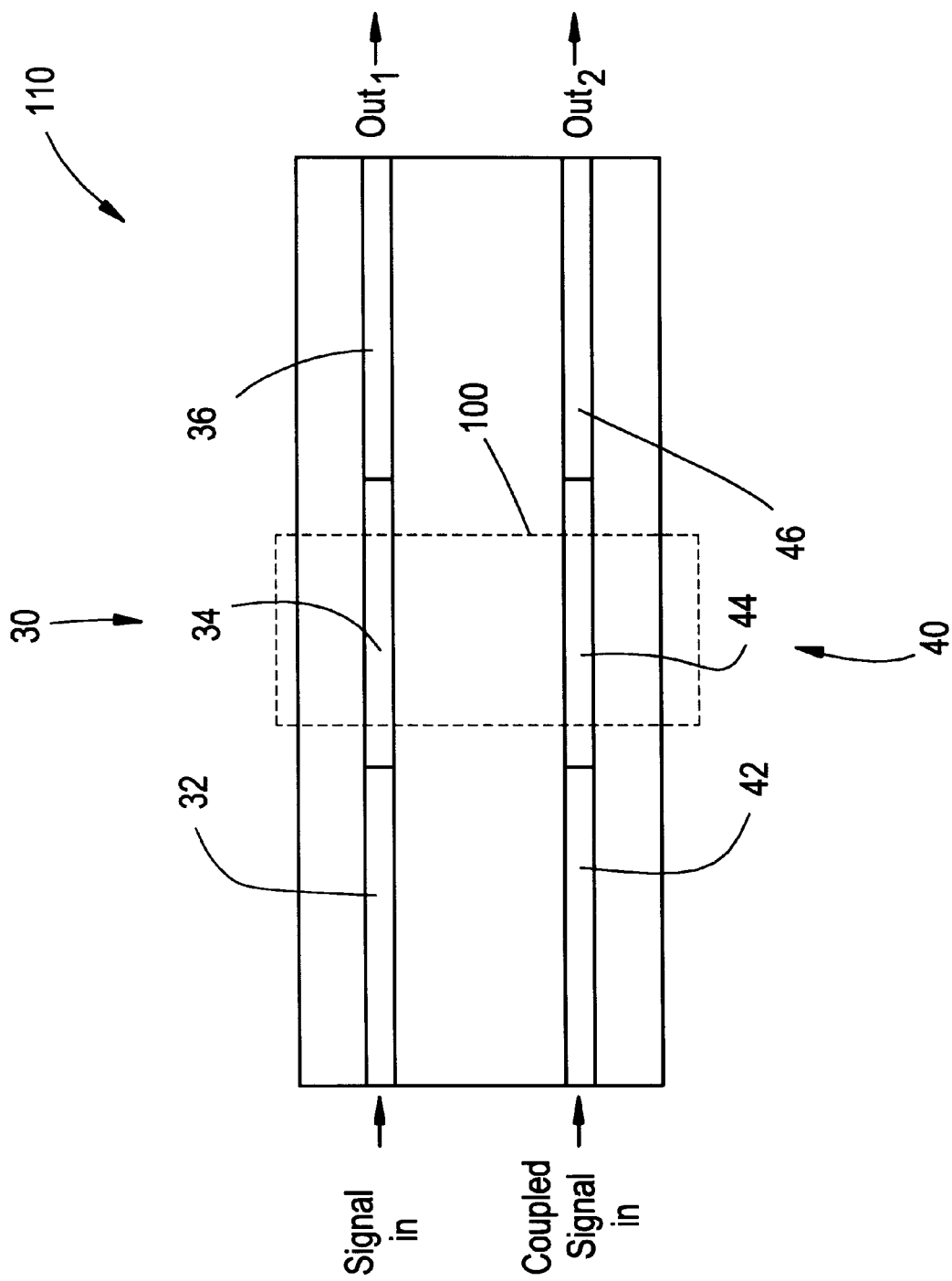
FIG. 3 is detail view of the first and second polarization-maintaining fibers.

FIG. 3 is a detail view of the first polarization-maintaining fiber 30 and the second polarization-maintaining fiber 40. In one embodiment of the present invention, the first polarization-maintaining fiber 30 and the second polarization-maintaining fiber 40 are deployed in a ribbon cable 110. As briefly mentioned above, the first polarization-maintaining fiber 30 consists of three first fiber segments 32, 34, and 36 that are fused together. The second polarization-maintaining fiber 40 consists of three second fiber segments 42, 44, and 46 which are likewise fused together to form a single polarization-maintaining fiber 40. The portion of ribbon cable 110 that is disposed in environment 100 includes segments 34 and 44.

Figure 4:
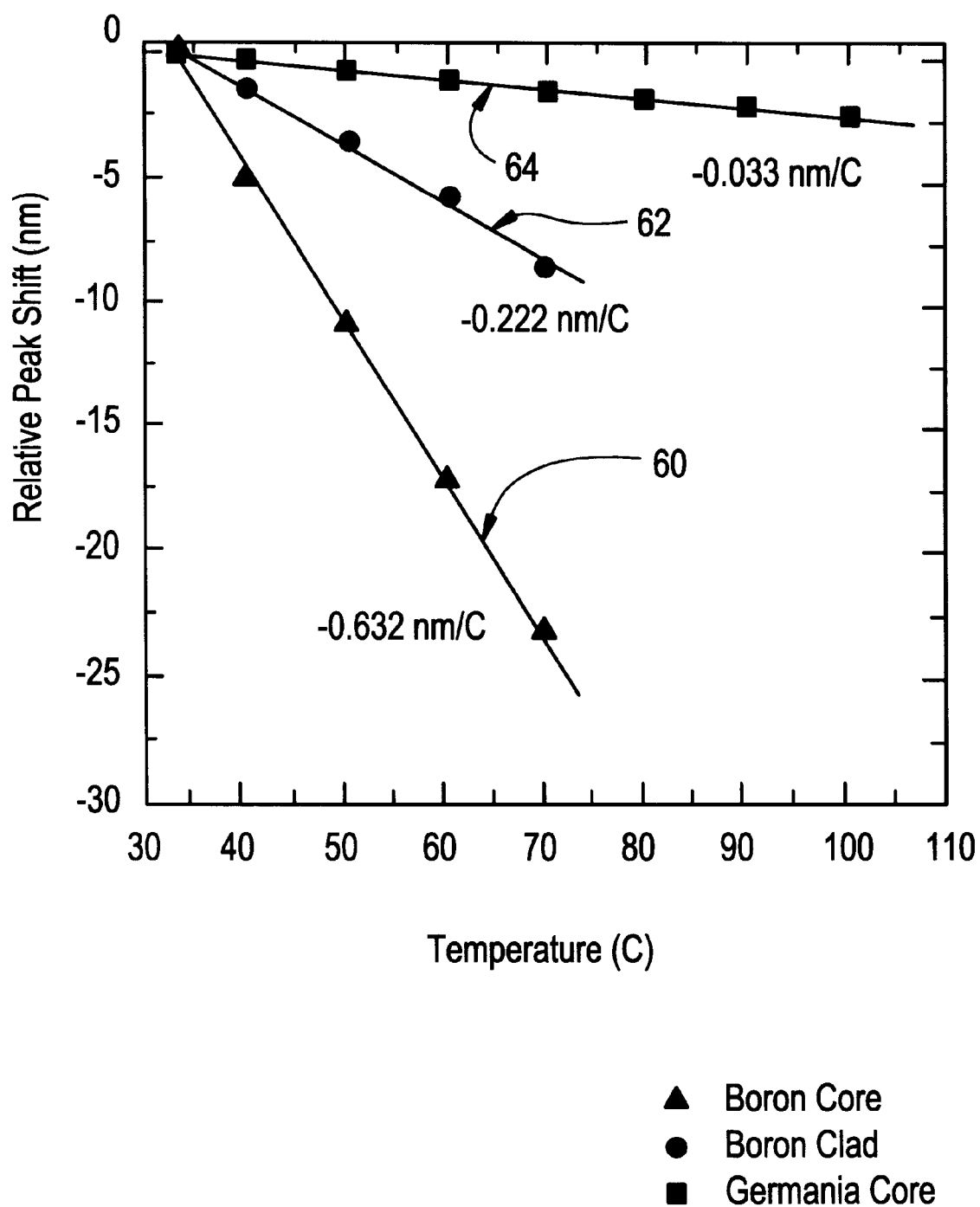
FIG. 4 is a graph comparing the relative wavelength shift with respect to temperature of the various polarization maintaining fibers used in the sensor of the present invention.

FIG. 4 shows the change in wavelength with respect to temperature of the polarization-maintaining fibers 22 and 24 using different sensing elements 38. A sensing element 38 represented by temperature response curve 60 is implemented by using a 7% boron doped core. This fiber has a Δ=1% and provides a phase shift at the rate of −0.632 nm/C.° in response to temperature changes, wherein Δ signifies the fractional refractive index difference between the core and cladding. A sensing element 38 represented by temperature response curve 62 is implemented by using a 7% boron-doped cladding. This fiber has a Δ=2% and provides a phase shift at the rate of −0.222 nm/C.° in response to temperature changes. A sensing element 38, is implemented by using a parabolic germania doped core that has 40% germania doping in the center of the core, 0% at the edge of the core, and has a Δ=2%. This fiber is represented by temperature response curve 64. It provides a phase shift at the rate of −0.033 nm/C.° in response to changes in temperature.

Figure 5:
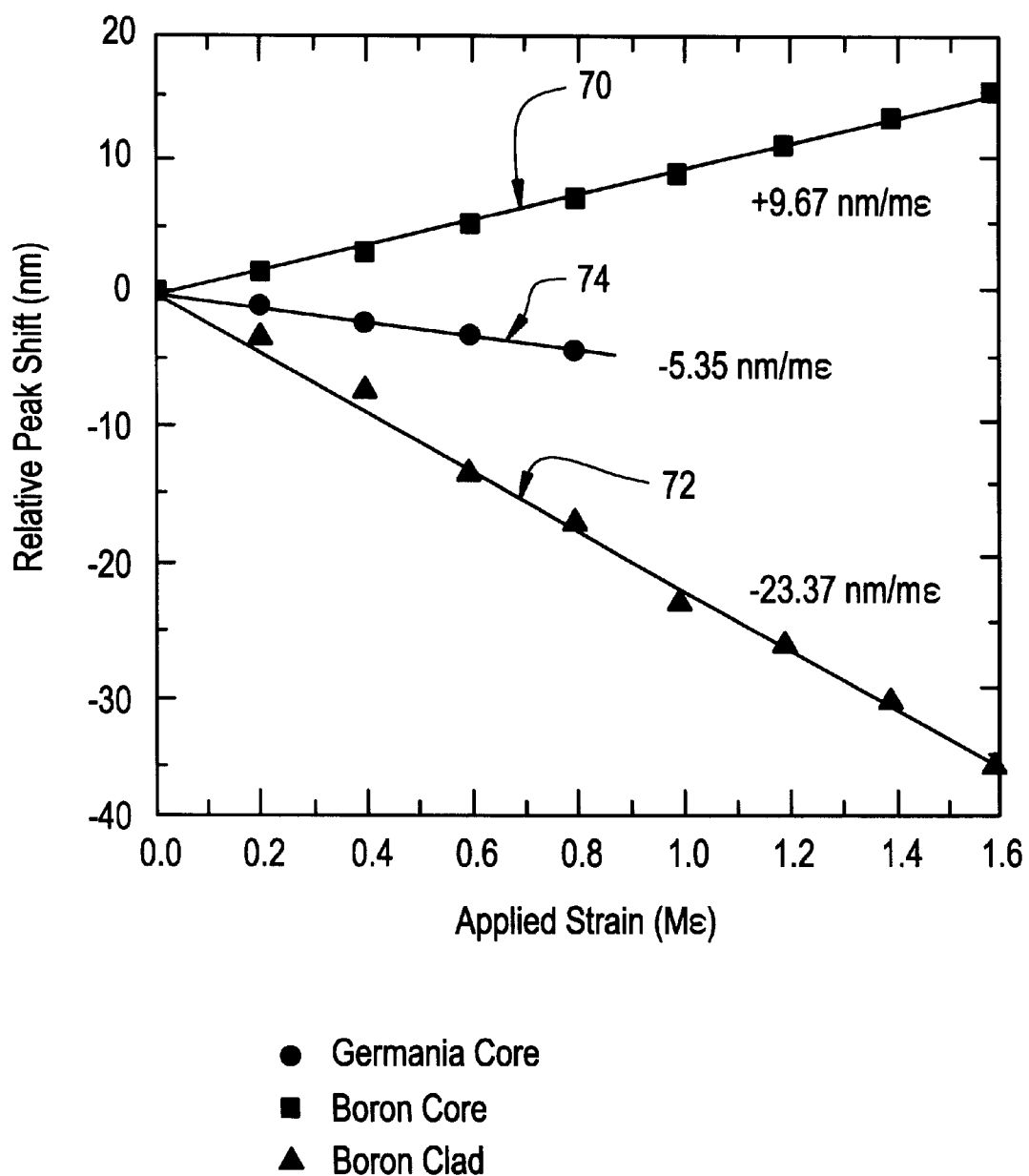
FIG. 5 is a graph comparing the relative wavelength shift with respect to applied strain of various polarization maintaining fibers used in the sensor of the present invention.

FIG. 5 shows the change in wavelength with respect to axial stress of the three fibers discussed in FIG. 4. The first sensing element implemented by using a 7% boron-doped core is represented by axial strain response curve 70. It provides a phase shift at a rate of +9.67 nm/mε in response to axial strain, wherein mε is. The second sensing element is implemented by using a 7% boron doped cladding is represented by axial strain response curve 72. It provides a phase shift at a rate of −23.37 nm/mε in response to axial strain. The third sensing element is implemented by using a parabolic germania doped core that has 40% germania doping in the center of the core, 0% at the edge of the core, and has a Δ=2%. The germania doped core is represented by axial strain response curve 74. It provides a phase shift at the rate of −0.033 nm/mε in response to axial strain on the fiber. In one embodiment of fiber optic sensor 10 depicted in FIGS. 1–3, the polarization-maintaining fiber pair includes a first fiber 30 having the 7% boron-doped core and a second fiber 40 having the 7% boron-doped cladding. This fiber pair is appropriate because the response curves shown in FIGS. 3 and 4 are very different. In an alternate embodiment, the germania-doped fiber with a Δ=2% can be used with any of the other two fibers previously discussed, e.g., the boron-doped core fiber or boron-doped clad fiber. It will be apparent to those of ordinary skill in the pertinent art that modifications and variations can be made in the selection of sensing element 38. For example, any two of the three fibers discussed above with respect to FIGS. 3 or 4 can be selected and used to implement fiber sensor 10.

Figure 6:
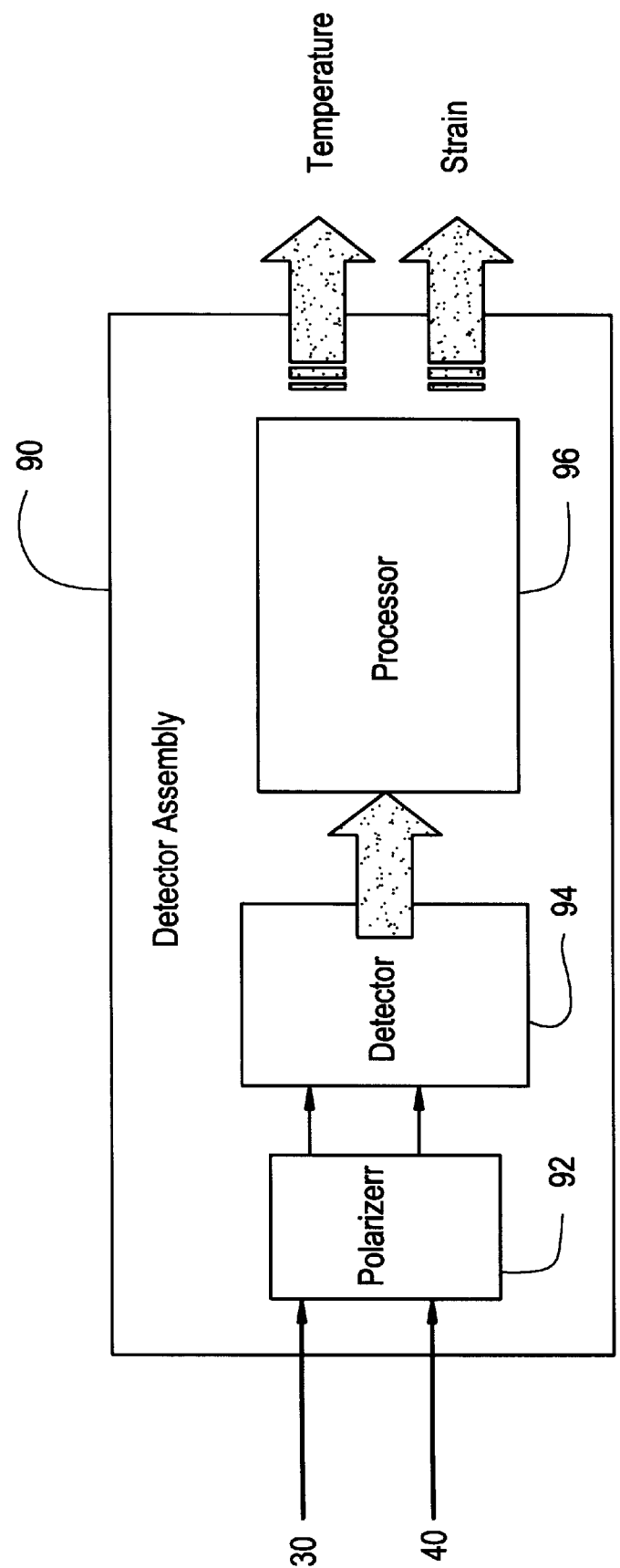
FIG. 6 is a block diagram showing the detector assembly.

FIG. 6 is a detail view of the detector assembly 90. The detector assembly 90 consists of a polarizer 92, a detector 94 and a processor 96. The detector 94 receives an output signal from the first polarization-maintaining fiber 30 and a second output signal from second polarization fiber 40 after they are polarized by polarizer 92. The presence of the sensing element 38, not shown, in the first fiber 30 causes its output signal to be phase shifted by an amount $\phi_1$ with respect to the input light signal from light source 80, see FIG. 1. The presence of the sensing element 38 in the second fiber 40 also causes its output signal to be phase shifted by an amount $\phi_2$ with respect to the input light signal from light source 80. The values of $\phi_1$ and $\phi_2$ are used by processor 96 to calculate a plurality of environmental parameters. Using any two of the fibers discussed above, the values for stress and temperature can be de-coupled using the following equations:

$$\phi_1 = C_1 \Delta T + K_1 \Delta S \quad (6)$$

$$\phi_2 = C_2 \Delta T + K_2 \Delta S \quad (7)$$

In equation (6) and (7), ΔT is the change in temperature, ΔS is the change in axial strain, $C_1$ and $C_2$ are the slopes of the temperature response curves (FIG. 4) of the first and second polarization-maintaining fibers 30, 40, and $K_1$ and $K_2$ are the slopes of the axial stress response curves (FIG. 5) of the first and second polarization-maintaining fibers 30 and 40. By subtracting equation (6) from equation (7), the following equation is obtained:

$$\phi = \phi_1 - \phi_2 = (C_1 + C_2)\Delta T + (K_1 + K_2)\Delta S \quad (8)$$

By knowing the physical properties of each of the polarization maintaining fibers, an appropriate multiple can be chosen to eliminate a variable in equation 8:

$$\phi = \chi \phi_1 - \phi_2 = (C_1 + C_2)\Delta T \quad (9)$$

$$\phi = \phi_1 - \gamma \phi_2 = (K_1 + K_2)\Delta S \quad (10)$$

Equation (9) can then be easily solved to find temperature, whereas equation (10) can be solved to find the axial stress on the fibers.

The fiber sensor shown in FIGS. 1 and 6 operates as follows. Light source 80 directs a polarized light signal into fiber 30. The light signal is coupled into fiber 40 in coupling region 50. Segments 34 and 44 are disposed in the environment 100 being measured. The temperature and the strain in the environment 100 change the path length of segments 34 and 44 and thereby shift the phase of the light signal. By way of example, the sensing element 38 in fiber 30 is a 7% boron doped core and the sensing element 38 in fiber 40 is a 40% parabolic germania doped core. Thus, as the path length changes in fiber 30 and fiber 40 due to the temperature and strain changes in the environment, the phase shift $\phi_1$ and $\phi_2$ sensed by each fiber is different because of the different type of sensing element present in each fiber. These values will be in accordance with the Temperature and Strain Response Curves shown in FIGS. 4 and 5. The phase shifts are detected by the detector 94 after the light signal is polarized by polarizer 92. The processor 96 is programmed to know which sensing element 38 is present in each fiber. Thus, after receiving $\phi_1$ and $\phi_2$ from the detector 94, it supplies the appropriate constants for equations (6)–(10) and calculates temperature and strain.

It will be apparent to those skilled in the art that various modifications and variations can be made to the present invention without departing from the spirit or scope of the invention. Thus, it is intended that the present invention covers the modifications and variations provided they come within the scope of the appended claims and their equivalents.

What is claimed is:

1. An optical fiber for propagating a light signal characterized by a center wavelength, said optical fiber disposed in an environment and used for measuring a plurality of environmental parameters, said optical fiber comprising:

a plurality of polarization maintaining fiber segments each of which having a cladding and an elliptical core, wherein each of said plurality of polarization maintaining fiber segments is rotated 45° with respect to a preceding fiber segment and optically connected to said preceding fiber segment; and, a sensing element disposed in said plurality of polarization maintaining fiber segments, wherein said sensing element shifts the center wavelength of the light signal at a predetermined rate in response to the plurality of environmental parameters.

2. The optical fiber according to claim 1, wherein the plurality of polarization maintaining fiber segments further comprises:

a first fiber segment;

a second fiber segment rotated 45° with respect to said first fiber segment; and, a third fiber segment rotated 45° with respect to said second fiber segment and 90° with respect to said first fiber segment.

3. The optical fiber according to claim 2, wherein the phase shifter comprises Germania doping in the elliptical cores.

4. The optical fiber according to claim 3, wherein $\Delta_{clad}$=2.0%.

5. The optical fiber according to claim 2, wherein the phase shifter comprises 7% Boron doping in the elliptical cores.

6. The optical fiber according to claim 5, wherein $\Delta_{clad}$=1.0%.

7. The optical fiber according to claim 2, wherein the phase shifter comprises 7% Boron doping in the cladding.

8. The optical fiber according to claim 7, wherein $\Delta_{clad}$=2.0%.

9. A Mach-Zehnder device for propagating a light signal characterized by a center wavelength, disposed in an environment and used for measuring a plurality of environmental parameters, said Mach-Zehnder device comprising:
- a first polarization maintaining fiber for propagating the light signal, said first polarization maintaining fiber includes a first elliptical core, a first cladding, and a plurality of first fiber segments, wherein each of said plurality of first fiber segments is rotated 45° with respect to a preceding first fiber segment and optically connected to said preceding first fiber segment;
- a second polarization maintaining fiber for coupling the light signal, said second polarization-maintaining fiber disposed adjacent to said first polarization-maintaining fiber and including a second elliptical core, a second cladding, and a plurality of second fiber segments, wherein each of said plurality of second fiber segments is rotated 45° with respect to a preceding second fiber segment and optically connected to said preceding second fiber segment; and,
- a sensing element disposed in said first and second polarization maintaining fibers, for shifting the center wavelength of the light signal at a first predetermined rate in said first polarization-maintaining fiber and at a second predetermined rate in said second polarization-maintaining fiber, in response to the plurality of environmental parameters.

10. The Mach-Zehnder device according to claim 9, wherein the plurality of first fiber segments further comprise:
- a first fiber segment;
- a second fiber segment rotated 45° with respect to said first fiber segment; and,
- a third fiber segment rotated 45° with respect to said second fiber segment and 90° with respect to said first fiber segment.

11. The Mach-Zehnder device according to claim 10, wherein the plurality of second fiber segments further comprise:
- a fourth fiber segment;
- a fifth fiber segment rotated 45° with respect to said fourth fiber segment; and,
- a sixth fiber segment rotated 45° with respect to said fifth fiber segment and 90° with respect to said sixth fiber segment.

12. The Mach-Zehnder device according to claim 11, wherein the sensing element comprises Germania doping in the first elliptical core and 7% Boron doping in the second cladding.

13. The Mach-Zehnder device according to claim 12, wherein the first polarization maintaining fiber has a first $\Delta_{clad}$=2.0% and the second polarization-maintaining fiber has a second $\Delta_{clad}$=2.0%.

14. The Mach-Zehnder device according to claim 13, wherein the sensing element comprises Germania doping in the first elliptical core and 7% Boron doping in the second elliptical core.

15. The Mach-Zehnder device according to claim 14, wherein the first polarization maintaining fiber has a first $\Delta_{clad}$=2.0% and the second polarization-maintaining fiber has a second $\Delta_{clad}$=1.0%.

16. The Mach-Zehnder device according to claim 11, wherein the sensing element comprises 7% Boron doping in the first elliptical core and 7% Boron doping in the second cladding.

17. The Mach-Zehnder device according to claim 16, wherein the first polarization-maintaining fiber has a first $\Delta_{clad}$=1.0% and the second polarization-maintaining fiber has a second $\Delta_{clad}$=2.0%.

18. The Mach-Zehnder device according to claim 11 further comprising:
- a detector assembly for detecting a plurality of environmental parameters based on a first phase shift amount $\phi_1$ in said first polarization-maintaining fiber and a second phase shift amount $\phi_2$ in said second polarization-maintaining fiber.

19. The Mach-Zehnder device according to claim 18, wherein the detector assembly further comprises:
- a processor for deconvolving each of the plurality of environmental parameters from the first phase shift amount $\phi_1$ and the second phase shift amount $\phi_2$.

20. The Mach-Zehnder device according to claim 18, wherein the first amount $\phi_1$ and the second amount $\phi_2$ are characterized by the equations:

$$\phi_1 = C_1 \Delta T + K_1 \Delta S; \text{ and,}$$

$$\phi_2 = C_2 \Delta T + K_2 \Delta S,$$

wherein $C_1$ is the ratio of wavelength shift with respect to temperature change in the first polarization maintaining fiber, $C_2$ is the ratio of wavelength shift with respect to temperature change in the second polarization maintaining fiber, $K_1$ is the ratio of wavelength shift with respect to the change in applied axial stress in the first polarization maintaining fiber, $K_2$ is the ratio of wavelength shift with respect to the change in applied axial stress in the second polarization maintaining fiber, $\Delta T$ is the change in temperature, and $\Delta S$ is the change in applied axial stress.

21. A fiber optic sensor disposed in an environment and used for measuring a plurality of environmental parameters, said fiber optic sensor comprising:
- a polarized light source for transmitting a light signal having a center wavelength;
- a first polarization-maintaining fiber connected to said polarized light source, said first polarization-maintaining fiber includes a first elliptical core, a first cladding, and a first plurality of fiber segments;
- a second polarization-maintaining fiber for coupling said light signal, said second polarization-maintaining fiber being disposed adjacent said first polarization maintaining fiber and including a second elliptical core, a second cladding, and a second plurality of fiber segments;
- a sensing element disposed in said first and second polarization-maintaining fibers for shifting the center wavelength of the light signal at a first predetermined rate in said first polarization maintaining fiber and at a second predetermined rate in said second polarization maintaining fiber, in response to the plurality of environmental parameters; and, a detector assembly for independently determining each of the plurality of environmental parameters in accordance with said first predetermined rate and said second predetermined rate.

22. The Fiber optic sensor device according to claim 21, wherein the first plurality of fiber segments further comprise:

a first fiber segment;

a second fiber segment rotated 45° with respect to said first fiber segment; and, a third fiber segment rotated 45° with respect to said second fiber segment and 90° with respect to said first fiber segment.

23. The Fiber optic sensor device according to claim 22, wherein the second plurality of fiber segments further comprise:

a fourth fiber segment;

a fifth fiber segment rotated 45° with respect to said fourth fiber segment; and, a sixth fiber segment rotated 45° with respect to said fifth fiber segment and 90° with respect to said sixth fiber segment.

24. The Fiber optic sensor device according to claim 23, wherein the phase shifter comprises Germania doping in the first elliptical core and 7% Boron doping in the second cladding.

25. The Fiber optic sensor device according to claim 24, wherein the first polarization maintaining fiber has a first $\Delta_{clad}$=2.0% and the second polarization maintaining fiber has a second clad $\Delta_{clad}$=2.0%.

26. The Fiber optic sensor device according to claim 25, wherein the phase shifter comprises Germania doping in the first elliptical core and 7% Boron doping in the second elliptical core.

27. The Fiber optic sensor device according to claim 26, wherein the first polarization maintaining fiber has a first $\Delta_{clad}$=2.0% and the second polarization maintaining fiber has a second $\Delta_{clad}$=1.0%.

28. The Fiber optic sensor device according to claim 23, wherein the phase shifter comprises 7% Boron doping in the first elliptical core and 7% Boron doping in the second cladding.

29. The Fiber optic sensor device according to claim 28, wherein the first polarization maintaining fiber has a first $\Delta_{clad}$=1.0% and the second polarization maintaining fiber has a second $\Delta_{clad}$=2.0%.

30. The Fiber optic sensor device according to claim 24, wherein the detector assembly detects a first phase shift amount $\phi_1$ in said first polarization maintaining fiber and a second phase shift amount $\phi_2$ in said second polarization maintaining fiber.

31. The Fiber optic sensor device according to claim 30, wherein the detector assembly further comprises:

a processor for determining the plurality of environmental parameters from the first phase shift amount $\phi_1$ in said first polarization maintaining fiber and a second phase shift amount $\phi_2$ in said second polarization maintaining fiber.

32. The Fiber optic sensor device according to claim 31, wherein the first amount $\phi_1$ and the second amount $\phi_2$ are characterized by the equations:

$\phi_1 = C_1 \Delta T + K_1 \Delta S$; and, $\phi_2 = C_2 \Delta T + K_2 \Delta S$, wherein $C_1$ is the ratio of wavelength shift with respect to temperature change in the first polarization maintaining fiber, $C_2$ is the ratio of wavelength shift with respect to temperature change in the second polarization maintaining fiber, $K_1$ is the ratio of wavelength shift with respect to the change in applied axial stress in the first polarization maintaining fiber, $K_2$ is the ratio of wavelength shift with respect to the change in applied axial stress in the second polarization maintaining fiber, $\Delta T$ is the change in temperature, and $\Delta S$ is the change in applied axial stress.

33. A method of measuring a plurality of environmental parameters in a fiber optic sensor comprising a polarized light source for transmitting a light signal having a center wavelength, a first polarization maintaining fiber connected to said polarized light source, said first polarization maintaining fiber includes a first elliptical core, a first cladding, and a first plurality of fiber segments, said method comprising the steps of:

providing a second polarization maintaining fiber disposed adjacent to the first polarization maintaining fiber such that the light signal is coupled between said first and second polarization maintaining fibers, said second polarization maintaining fiber includes a second elliptical core, a second cladding, and a second plurality of fiber segments; and, phase shifting the center wavelength of the light signal by a first amount $\phi_1$ in said first polarization maintaining fiber and by a second amount $\phi_2$ in said second polarization maintaining fiber, in response to the plurality of environmental parameters.

34. The method according to claim 33 further comprising the steps of:

detecting the first phase shift amount $\phi_1$ and the second phase shift amount $\phi_2$; and, determining each of the plurality of environmental parameters from the first phase shift amount $\phi_1$ and the second phase shift amount $\phi_2$, wherein each of the calculated environmental parameters is de-coupled and independent from any other of the plurality of environmental parameters.

35. The method according to claim 34, wherein the plurality of environmental parameters comprises temperature and applied axial stress.

36. The method according to claim 35, wherein the first amount $\phi_1$ and the second amount $\phi_2$ are characterized by the equations:

$\phi_1 = C_1 \Delta T + K_1 \Delta S$; and, $\phi_2 = C_2 \Delta T + K_2 \Delta S$, wherein $C_1$ is the ratio of wavelength shift with respect to temperature change in the first polarization maintaining fiber, $C_2$ is the ratio of wavelength shift with respect to temperature change in the second polarization maintaining fiber, $K_1$ is the ratio of wavelength shift with respect to the change in applied axial stress in the first polarization maintaining fiber, $K_2$ is the ratio of wavelength shift with respect to the change in applied axial stress in the second polarization maintaining fiber, $\Delta T$ is the change in temperature, and $\Delta S$ is the change in applied axial stress.

* * * * *